(12) United States Patent
Ishida

(10) Patent No.: US 10,173,494 B2
(45) Date of Patent: Jan. 8, 2019

(54) VEHICLE AIR CONDITIONER WITH HEATING STARTUP EXPANSION VALVE CONTROL

(71) Applicant: HONDA MOTOR CO., LTD., Tokyo (JP)

(72) Inventor: Osamu Ishida, Tochigi (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 15/292,245

(22) Filed: Oct. 13, 2016

(65) Prior Publication Data

US 2017/0106723 A1    Apr. 20, 2017

(30) Foreign Application Priority Data

Oct. 14, 2015    (JP) .................................. 2015-202675

(51) Int. Cl.
*B60H 1/00* (2006.01)
*B60H 1/22* (2006.01)

(52) U.S. Cl.
CPC ....... *B60H 1/00921* (2013.01); *B60H 1/2221* (2013.01); *B60H 2001/00957* (2013.01)

(58) Field of Classification Search
CPC .................. B60H 1/00921; F25B 2500/26
See application file for complete search history.

(56) References Cited

U.S. PATENT DOCUMENTS

| | | | |
|---|---|---|---|
| 5,224,354 A * | 7/1993 | Ito | F25B 41/062 62/196.3 |
| 6,314,750 B1 * | 11/2001 | Ishikawa | B60H 1/00921 62/129 |

(Continued)

FOREIGN PATENT DOCUMENTS

| | | |
|---|---|---|
| JP | UM-A-04-001370 | 1/1992 |
| JP | A-09-159292 | 6/1997 |

(Continued)

OTHER PUBLICATIONS

JP Office Action dated Sep. 18, 2018 from corresponding Japanese patent application No. 2015-202675 (with attached English-language translation).

*Primary Examiner* — Jonathan Bradford
(74) *Attorney, Agent, or Firm* — Drinker Biddle & Reath LLP

(57) ABSTRACT

A vehicle air conditioner includes a control device and a heating refrigerant circuit having: a compressor that compresses and discharges a suctioned refrigerant; an internal condenser that releases heat of the discharged refrigerant; an expansion valve that reduces a pressure of the refrigerant which passes through the internal condenser and that expands the refrigerant; and an external heat exchanger that exchanges heat between the refrigerant which passes through the expansion valve and external air and that causes the refrigerant after the heat exchange to return to the compressor. The opening degree of the expansion valve is controlled by the control device to be increased at a start of a heating operation to more than an ordinary opening degree during a heating operation to start the compressor, and after a set time elapses, to be caused to return to the ordinary opening degree during a heating operation.

1 Claim, 6 Drawing Sheets

(56) References Cited

U.S. PATENT DOCUMENTS

| | | | | |
|---|---|---|---|---|
| 6,539,734 | B1* | 4/2003 | Weyna | F04B 39/0207 62/126 |
| 8,205,463 | B2* | 6/2012 | Lee | F25B 13/00 62/210 |
| 2008/0023563 | A1* | 1/2008 | Tamura | F25B 13/00 236/67 |
| 2009/0216377 | A1* | 8/2009 | Lee | F25B 13/00 700/275 |
| 2015/0052923 | A1* | 2/2015 | Kanazawa | F25B 13/00 62/223 |

FOREIGN PATENT DOCUMENTS

| | | |
|---|---|---|
| JP | A-2001-174091 | 6/2001 |
| JP | 2011-052842 A | 3/2011 |

\* cited by examiner

VEHICLE AIR CONDITIONER WITH HEATING STARTUP EXPANSION VALVE CONTROL

CROSS-REFERENCE TO RELATED APPLICATION

Priority is claimed on Japanese Patent Application No. 2015-202675, filed on Oct. 14, 2015, the contents of which are incorporated herein by reference.

BACKGROUND

Field of the Invention

The present invention relates to a vehicle air conditioner using a heat pump cycle.

Background

In vehicles including no engine such as electric vehicles, an air conditioner that performs a heating operation utilizing a heat pump cycle may be used.

A vehicle air conditioner using a heat pump cycle includes a heating refrigerant circuit in which a refrigerant is circulated during a heating operation. The heating refrigerant circuit has a compressor that compresses and discharges a suctioned refrigerant, an internal condenser that exchanges heat between the refrigerant discharged from the compressor and conditioning air, an expansion valve that reduces the pressure of the refrigerant which passes through the internal condenser and that expands the refrigerant, and an external heat exchanger that exchanges heat between the refrigerant which passes through the expansion valve and external air and that causes the refrigerant after the heat exchange to return to the compressor.

In this type of vehicle air conditioner, it is necessary to supply the refrigerant by the compressor during a heating operation, and therefore, vibrations at units easily occur in association with the drive of the compressor.

As building air conditioners, air conditioners are known in which a rubber elastic body is interposed between a compressor and an installation part in order to prevent the vibration of the compressor from being externally transmitted (for example, refer to Japanese Unexamined Patent Application, First Publication No. 2011-52842).

SUMMARY

However, the vehicle air conditioner described in Japanese Unexamined Patent Application, First Publication No. 2011-52842 does not directly prevent the vibration of the inside of the compressor, and therefore, it is difficult to effectively prevent a vibration sound or the like arising from a drive part inside the compressor coming into contact with a member in the vicinity of the drive part.

Further, in a case of a vehicle air conditioner that utilizes a heat pump system, when a compressor is started at the start of a heating operation, a drive part of the compressor is rotated under a situation where a refrigerant does not easily return from a heating refrigerant passage. At this time, the drive part of the compressor is rotated under a situation where the pressure inside the compressor is not sufficiently increased (under a situation where the density of the refrigerant suctioned by the compressor is not sufficiently increased), and therefore, the rotation becomes unstable to thereby easily cause vibrations or noises. That is, for example, in a scroll compressor or the like, since the setting is made such that the holding balance of the drive part is maintained in a state where the pressure inside the compressor is high, when the inside of the compressor is a low pressure state for a long time, the holding balance of the drive part of the compressor is degraded, and vibrations or noises are easily increased.

An aspect of the present invention provides a vehicle air conditioner capable of preventing vibrations or noises at a compressor at the start of a heating operation from occurring.

In view of the foregoing, a vehicle air conditioner according to an aspect of the present invention includes a heating refrigerant circuit having: a compressor that compresses and discharges a suctioned refrigerant; an internal condenser that releases heat of the refrigerant discharged from the compressor; an expansion valve that reduces a pressure of the refrigerant which passes through the internal condenser and that expands the refrigerant; and an external heat exchanger that exchanges heat between the refrigerant which passes through the expansion valve and external air and that causes the refrigerant after the heat exchange with the external air to return to the compressor, and a control device that controls the expansion valve such that at a start of a heating operation, an opening degree of the expansion valve is increased to more than an ordinary opening degree during a heating operation to start the compressor, and after a set time elapses, the opening degree of the expansion valve is caused to return to the ordinary opening degree during a heating operation.

According to the configuration described above, at the start of a heating operation, according to the control by the control device, the expansion valve is widely opened to more than the ordinary opening degree during a heating operation, and in the state, the compressor is started. Thereby, a circulation resistance of the refrigerant in the heating refrigerant circuit is decreased, and the refrigerant easily returns to an intake part of the compressor promptly. After this state continues for a set time, at a time point when the internal pressure of the compressor is increased, the control device causes the opening degree of the expansion valve to return to the ordinary opening degree during the heating operation. Thereby, the operation state changes to the ordinary heating operation.

In the vehicle air conditioner described above, the control device may have: a signal input unit to which a start signal of a heating operation is input; an elapsed time determination unit that determines whether or not a set time elapses from when the start signal is input to the signal input unit; a valve opening degree control unit that opens the expansion valve such that the opening degree of the expansion valve is increased to more than the ordinary opening degree during a heating operation when the start signal is input to the signal input unit and that causes the opening degree of the expansion valve to return to the ordinary opening degree during a heating operation when the elapsed time determination unit determines that the set time has elapsed; and a compressor control unit that outputs a start command to the compressor when the valve opening degree control unit opens the expansion valve such that the opening degree of the expansion valve is increased to more than the ordinary opening degree during a heating operation.

According to the aspect of the present invention, at the start of a heating operation, the expansion valve is widely opened to more than the ordinary opening degree during a heating operation to start the compressor, and after the set time elapses, the expansion valve is caused to return to the ordinary opening degree during the heating operation. Therefore, it is possible to promptly increase the internal pressure of the compressor and to stabilize the operation of the drive part of the compressor. Accordingly, by employing the vehicle air conditioner according to the aspect of the present invention, it is possible to prevent vibrations or noises at the compressor at the start of a heating operation from occurring.

DESCRIPTION OF THE EMBODIMENTS

Hereinafter, an embodiment of the present invention is described with reference to the drawings.

Figure 1:
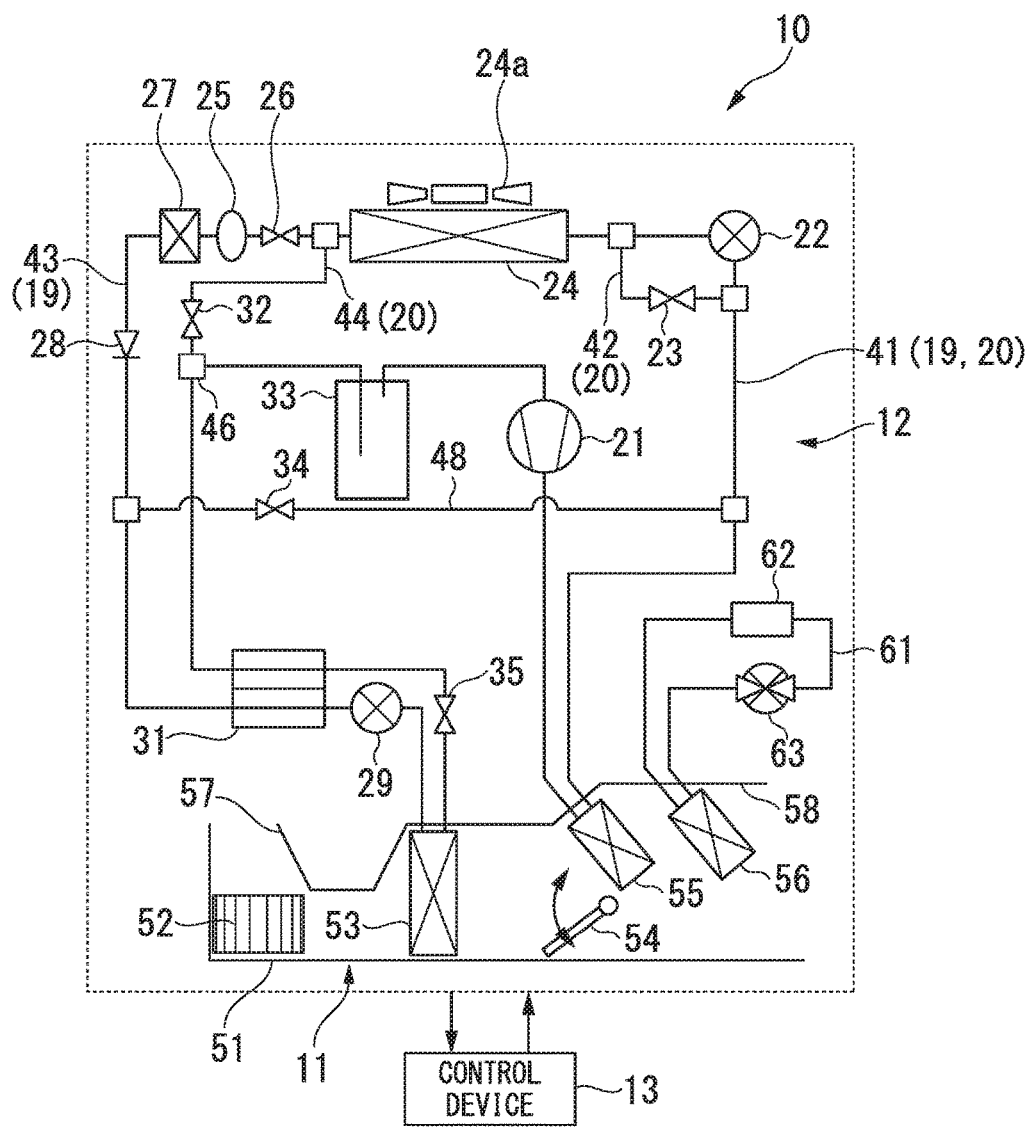
FIG. 1 is a configuration view of a vehicle air conditioner according to an embodiment of the present invention.

FIG. 1 is a configuration view of a vehicle air conditioner 10 according to the present embodiment.

The vehicle air conditioner 10 according to the present embodiment is provided on an electric vehicle or the like including no engine (internal-combustion engine) as a vehicle drive source and performs a heating operation utilizing a heat pump cycle. The vehicle air conditioner 10 includes an air conditioning unit 11, a heat pump cycle 12 in which a refrigerant can circulate, and a control device 13.

The air conditioning unit 11 includes a duct 51 through which conditioning air flows, a blower 52 that is housed in the duct 51, an evaporator 53 (cooling internal condenser), an air mix door 54, a heating internal condenser 55, and a heater core 56.

The duct 51 has an air intake port 57 arranged at an upstream position in the flow direction of the conditioning air and an air blow port 58 arranged at a downstream position. The blower 52, the evaporator 53, the air mix door 54, the heating internal condenser 55, and the heater core 56 are arranged in this order from the upstream positon toward the downstream position in the flow direction of the conditioning air.

The blower 52 is driven, for example, in response to a drive voltage applied by the control of the control device 13 and sends, toward the downstream, conditioning air (at least one of internal air and external air) that is introduced into the duct 51 through the air intake port 57.

The evaporator 53 exchanges heat between a low-pressure refrigerant that flows to the inside of the evaporator 53 and conditioning air (air flowing in the duct 51) that passes in the vicinity of the evaporator 53 and cools the conditioning air that passes in the vicinity of the evaporator 53 by heat absorption when the refrigerant evaporates.

The heating internal condenser 55 can release heat by a high-temperature and high-pressure refrigerant that passes through the inside of the heating internal condenser 55 and heats conditioning air that passes in the vicinity of the heating internal condenser 55.

The heater core 56 is arranged at a more downstream position than the heating internal condenser 55 in the duct 51. The heater core 56 is joined via a pipe 61 to a water heating electric heater 62 and a water pump 63. Water is circulated between the heater core 56 and the water heating electric heater 62 by the operation of the water pump 63. The water heated by the water heating electric heater 62 is supplied to the heater core 56, and thereby, conditioning air that passes in the vicinity of the heater core 56 is heated. The heating using the heater core 56 is performed when heating utilizing a heat pump cycle cannot be performed or when the heating power is insufficient by only heating utilizing a heat pump cycle.

The air mix door 54 is rotatably movable by a drive means (not shown) that is driven by a control of the control device 13. Specifically, the air mix door 54 is rotatably movable between a heating position (refer to FIG. 4) at which an air flow path (heating path) toward the heating internal condenser 55 and the heater core 56 in the duct 51 is opened and a cooling position (refer to FIG. 5) at which an air flow path (cooling path) that bypasses the heating path is opened.

For example, the heat pump cycle 12 includes the evaporator 53, the heating internal condenser 55, a compressor 21, a heating expansion valve 22 (expansion valve), a bypass valve 23, an external heat exchanger 24, a cooling valve 26, a receiver tank 25, a sub condenser 27, a check valve 28, a cooling expansion valve 29, a cooling supplementary heat exchanger 31, a heating valve 32, an accumulator 33, a dehumidification valve 34, and an evaporation capability control valve 35. These component members are joined via a refrigerant flow path.

The compressor 21 has an intake part joined to the accumulator 33 and has a discharge port joined to the heating internal condenser 55. The compressor 21 is driven by receiving a drive force of the drive means that is driven by the control of the control device 13, suctions mainly a gas part of the refrigerant from the accumulator 33, compresses the refrigerant, and then discharges the high-temperature and high-pressure refrigerant to the heating internal condenser 55.

The heating expansion valve 22 is a diaphragm valve of which the opening degree is adjustable by a control of the control device 13. When a heating operation is performed, the heating expansion valve 22 reduces the pressure of the refrigerant discharged from the heating internal condenser 55, expands the refrigerant, and then discharges the low-temperature and low-pressure refrigerant in a gas-liquid two-phase (liquid phase rich) mist state to the external heat exchanger 24.

A passage from the discharge port of the compressor 21 via the heating internal condenser 55 to the heating expansion valve 22 is a high-pressure main passage 41.

The bypass valve 23 is provided at the downstream part of the heating internal condenser 55, on a cooling bypass passage 42 that is joined to the external heat exchanger 24 and bypasses the heating expansion valve 22 of the high-pressure main passage 41. The bypass valve 23 is controlled to be open or closed by the control device 13. The bypass valve 23 is set to a closed state when the heating operation is performed. The bypass valve 23 is set to an open state when the cooling operation is performed.

Thereby, when the heating operation is performed, the refrigerant that flows out of the heating internal condenser 55 passes through the heating expansion valve 22 and flows into the external heat exchanger 24 in a state where the refrigerant is in a low-temperature and low-pressure state. On the other hand, when the cooling operation is performed, the refrigerant that flows out of the heating internal condenser 55 passes through the bypass valve 23 and flows into the external heat exchanger 24 in a state where the refrigerant is in a high-temperature state.

The external heat exchanger 24 exchanges heat between the refrigerant that flows into the external heat exchanger 24 and external atmosphere. A fan 24a that is capable of blowing air toward the external heat exchanger 24 is provided at the front of the external heat exchanger 24. The fan 24a is driven by a control of the control device 13.

When the heating operation is performed, the external heat exchanger 24 is capable of absorbing heat from the external atmosphere by the low-temperature and low-pressure refrigerant that passes through the inside of the external heat exchanger 24 and vaporizes the refrigerant by the heat absorption from the external atmosphere. On the other hand, when the cooling operation is performed, the external heat exchanger 24 is capable of releasing heat to the external atmosphere by the high-temperature refrigerant that passes through the inside of the external heat exchanger 24 and cools the refrigerant, for example, by the heat release to the external atmosphere and by the air blow of the fan 24a.

The cooling valve 26 is provided on a cooling main passage 43 that is joined to the downstream part of the external heat exchanger 24 of the refrigerant flow path. The cooling valve 26 is controlled to be open or closed by the control device 13. The cooling valve 26 is set to an open state when the cooling operation is performed. The cooling valve 26 is set to a closed state when the heating operation is performed.

The receiver tank 25 is provided at a downstream part of the cooling valve 26 of the cooling main passage 43. When the cooling operation is performed, the receiver tank 25 stores an excess refrigerant of the refrigerant that passes through the external heat exchanger 24 and flows into the cooling main passage 43.

The sub condenser 27 is provided at a more downstream position than the receiver tank 25 of the cooling main passage 43. The sub condenser 27 exchanges heat between the refrigerant that flows into the sub condenser 27 and external atmosphere.

The check valve 28 is provided at a more downstream position than the sub condenser 27 of the cooling main passage 43. When the cooling operation is performed, the check valve 28 causes the refrigerant that passes through the sub condenser 27 to flow toward the downstream. When the dehumidification operation is performed, the check valve 28 prevents the reverse flow of the refrigerant toward a more upstream position (sub condenser 27 direction) than the check valve 28 of the cooling main passage 43.

The cooling expansion valve 29 is a so-called diaphragm valve. The cooling expansion valve 29 is arranged between the check valve 28 and an inflow port of the evaporator 53 of the cooling main passage 43. The cooling expansion valve 29 reduces the pressure of the refrigerant that passes through the check valve 28 depending on the valve opening degree controlled by the control device 13, expands the refrigerant, and then discharges the low-temperature and low-pressure refrigerant in a gas-liquid two-phase (liquid phase rich) mist state to the evaporator 53.

The cooling supplementary heat exchanger 31 is arranged so as to bridge a space between an upstream part arranged at a more upstream position than the cooling expansion valve 29 of the cooling main passage 43 and a downstream part arranged at a more downstream position than the evaporator 53 of the cooling main passage 43. When the cooling operation is performed, the cooling supplementary heat exchanger 31 exchanges heat between the upstream part and downstream part described above and cools the refrigerant at the upstream part before flowing into the evaporator 53.

The cooling main passage 43 of the present embodiment is a passage joined to the accumulator 33 via the cooling valve 26, the receiver tank 25, the sub condenser 27, the check valve 28, the cooling supplementary heat exchanger 31, the cooling expansion valve 29, the evaporator 53, and the evaporation capability control valve 35 from the downstream part of the external heat exchanger 24.

The heating valve 32 is arranged on a heating bypass passage 44 that bypasses the cooling main passage 43 and joins the downstream part of the external heat exchanger 24 and the accumulator 33. The heating valve 32 is controlled to be open or closed by the control device 13. The heating valve 32 is set to an open state when the heating operation is performed. The heating valve 32 is set to a closed state when the cooling operation is performed.

The accumulator 33 is arranged between the compressor 21 and a junction part 46 that joins the downstream end of the cooling main passage 43 and the downstream end of the heating bypass passage 44. The accumulator 33 separates, into gas and liquid, the refrigerant that flows into the accumulator 33 from the junction part 46, stores an excess liquid part (liquid phase) of the refrigerant in the accumulator 33, and causes the compressor 21 to suction mainly the gas part (gas phase) of the refrigerant.

The dehumidification valve 34 is arranged on a dehumidification flow path 48 that joins part of the cooling main passage 43 arranged at a more downstream position than the check valve 28 and part of the high-pressure main passage 41 arranged at a more downstream position than the heating internal condenser 55. The dehumidification valve 34 is controlled to be open or closed by the control device 13. The dehumidification valve 34 is set to an open state when the dehumidification operation is performed. The dehumidification valve 34 is set to a closed state when an operation (cooling operation and heating operation) other than the dehumidification operation is performed.

The evaporation capability control valve 35 is arranged between the evaporator 53 and the cooling supplementary heat exchanger 31 of the cooling main passage 43. The evaporation capability control valve 35 is controlled to be open or closed by the control device 13. When the dehumidification operation is performed, the evaporation capability control valve 35 is controlled such that the opening degree is smaller than when the cooling operation is performed.

In the present embodiment, the vehicle air conditioner 10 includes a cooling refrigerant circuit 19 in which a refrigerant is circulated during a cooling operation and a heating refrigerant circuit 20 in which a refrigerant is circulated during a heating operation. The cooling and heating refrigerant circuits 19, 20 share the compressor 21, the external heat exchanger 24, and the accumulator 33.

The cooling refrigerant circuit 19 has: the cooling main passage 43 that joins the accumulator 33 and the downstream part of the external heat exchanger 24 via the cooling expansion valve 29 and the evaporator 53; and a passage that is formed of the cooling bypass passage 42 and part of the high-pressure main passage 41 that passes through the heating internal condenser 55, bypasses the heating expansion valve 22, and joins discharge part of the compressor 21 and the upstream part of the external heat exchanger 24.

The heating refrigerant circuit 20 has: the high-pressure main passage 41 that joins the discharge part of the compressor 21 and the upstream part of the external heat exchanger 24 via the heating internal condenser 55 and the heating expansion valve 22; and the heating bypass passage 44 that bypasses the cooling main passage 43 and joins the accumulator 33 and the downstream part of the external heat exchanger 24.

Lubricant oil for lubricating a sliding part of a device in the circuit such as the compressor 21 is mixed to the refrigerant circulated in the cooling refrigerant circuit 19 and the heating refrigerant circuit 20. In consideration of a heating operation at which it is necessary to operate the compressor 21 at a high rotation speed, a sufficient amount of lubricant oil that can lubricate the compressor 21 during the heating operation is mixed to the refrigerant.

Figure 2:
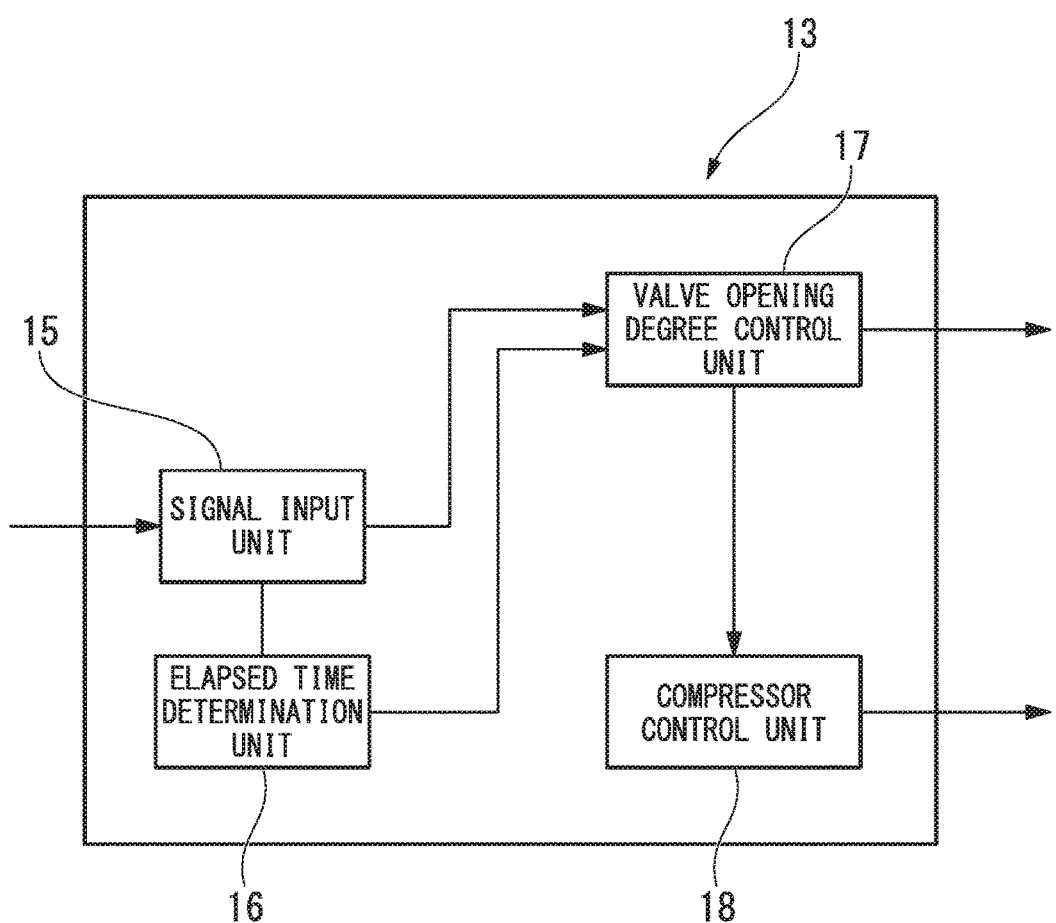
FIG. 2 is a functional block diagram of a control device of the vehicle air conditioner according to the embodiment of the present invention.

FIG. 2 is a block diagram showing a main function of the control device 13 relating to the start of the heating operation.

As shown in FIG. 2, the control device 13 has a signal input unit 15, an elapsed time determination unit 16, a valve opening degree control unit 17, and a compressor control unit 18.

The signal input unit 15 is a part to which a start signal of a heating operation is input. For example, when a main switch of the vehicle air conditioner 10 is turned on in a state where an air conditioning mode change switch (not shown) is at a heating position, when the air conditioning mode change switch is switched to the heating position in a state where the main switch of the vehicle air conditioner 10 is in an on position, or the like, the start signal of the heating operation is input to the signal input unit 15.

The elapsed time determination unit 16 determines whether or not a set time elapses from when the start signal of the heating operation is input to the signal input unit 15.

The valve opening degree control unit 17 controls the heating expansion valve 22 such that the opening degree of the heating expansion valve 22 is opened maximally (opened to more than an ordinary opening degree during the heating operation) when the start signal is input to the signal input unit 15 and the opening degree of the heating expansion valve 22 is caused to return to the ordinary opening degree during the heating operation when the elapsed time determination unit 16 determines that the set time has elapsed.

When the elapsed time determination unit 16 maximizes the opening degree of the heating expansion valve 22, the compressor control unit 18 outputs a start command to the compressor 21 to start the compressor 21.

The control device 13 controls the heating expansion valve 22 by the function of the signal input unit 15, the elapsed time determination unit 16, the valve opening degree control unit 17, and the compressor control unit 18 such that at the start of the heating operation, the opening degree of the heating expansion valve 22 is maximized to start the compressor 21, and after the set time elapses, the opening degree of the heating expansion valve 22 is caused to return to the ordinary opening degree during the heating operation. Accordingly, at the start of the heating operation, the compressor 21 is started in a state where the opening degree of the heating expansion valve 22 is maximized, and therefore, the circulation resistance of the refrigerant in the heating refrigerant circuit 20 is decreased. Therefore, the refrigerant promptly returns to the intake part of the compressor 21, and the compressor 21 is promptly driven to rotate in a high pressure state.

Figure 3:
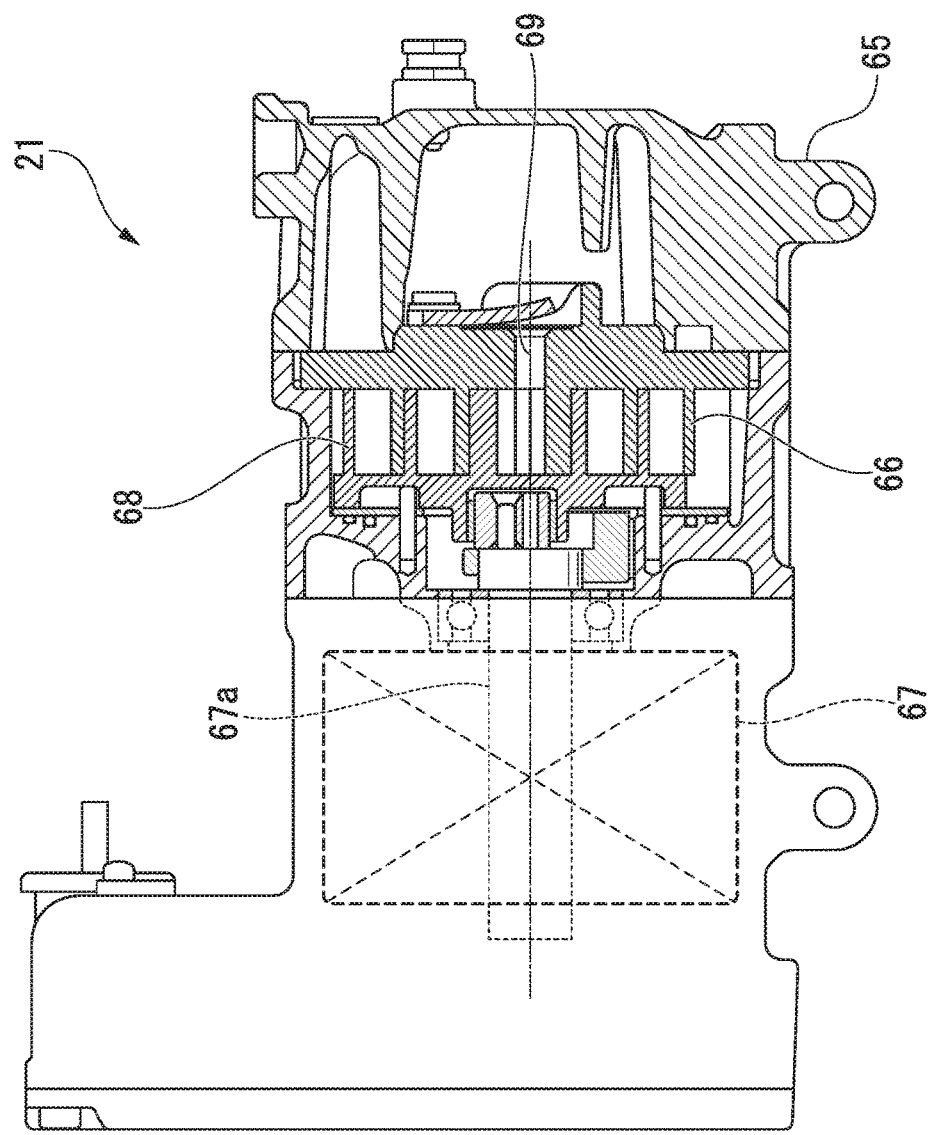
FIG. 3 is a partial cross-sectional side view of a compressor of the vehicle air conditioner according to the embodiment of the present invention.

FIG. 3 is a partial cross-sectional view of the compressor 21 of the present embodiment.

The compressor 21 according to the present embodiment is a scroll compressor. The compressor 21 includes a stationary scroll 66 inside a housing 65 and a movable scroll 68 that is driven to be swirled by a motor 67. The movable scroll 68 is supported in an eccentric state by a drive shaft 67a of the motor 67 and is swirled while maintaining a constant attitude in the housing 65. The compressor 21 changes the volume of a space partitioned by the stationary scroll 66 and the movable scroll 68 according to the rotational movement of the movable scroll 68 and discharges the refrigerant suctioned from an intake port (not shown) to a discharge port 69 while compressing the refrigerant.

In the scroll compressor 21 of the present embodiment, the movable scroll 68 as a drive part is swirled in the housing 65. A slight gap is set in the axis direction between the movable scroll 68 and the housing 65 in order to allow the movable scroll 68 to be swirled in the housing 65. When the internal pressure of the compressor 21 is increased, the movable scroll 68 is pushed to the inner surface of the housing 65 with a uniform force by the pressure, and thereby, the movable scroll 68 is rotated at a stable attitude in the housing 65. Accordingly, when the compressor 21 is started during the heating operation, it is desirable for stabilizing the rotation to promptly increase the pressure inside the compressor 21.

Figure 4:
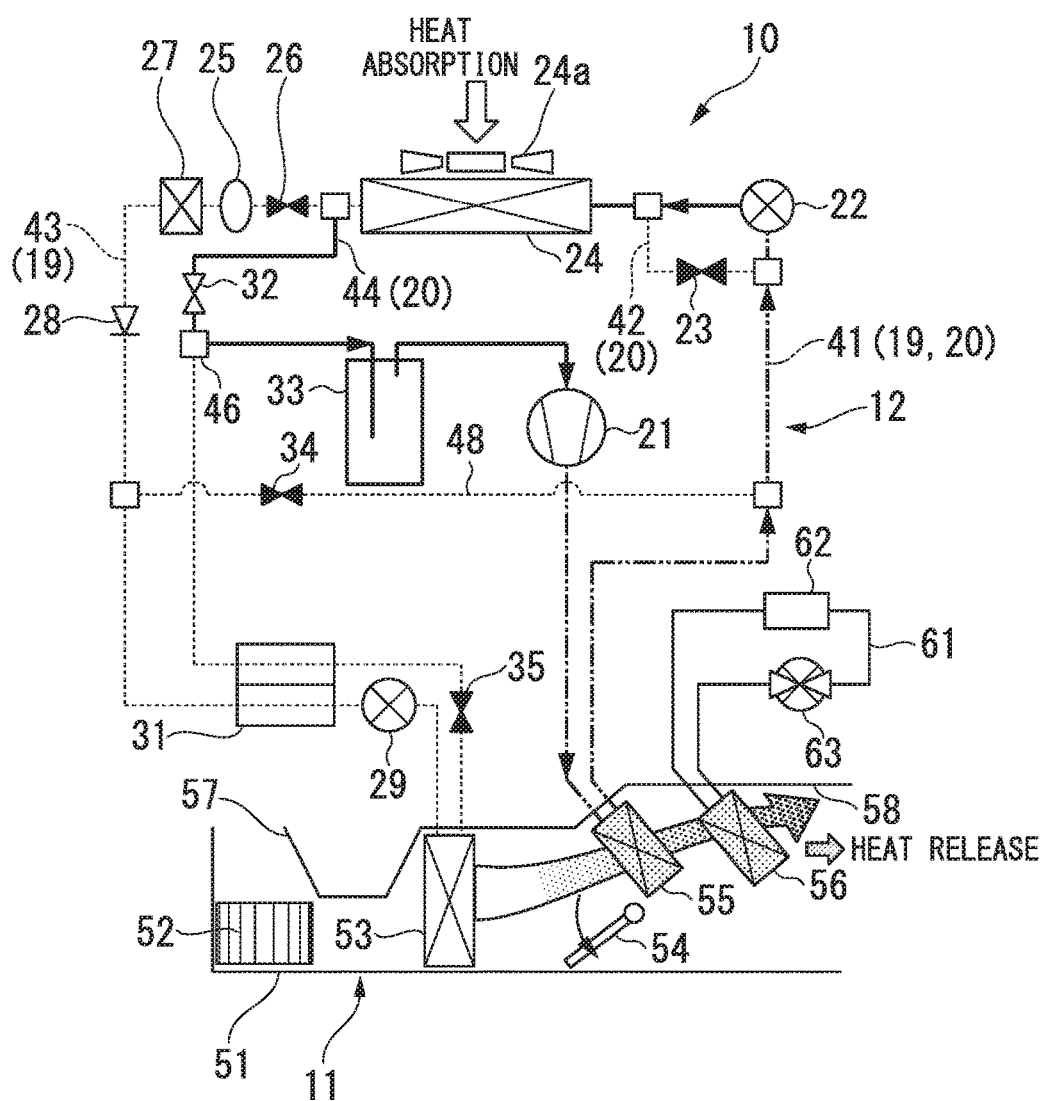
FIG. 4 is a configuration view of the vehicle air conditioner according to the embodiment of the present invention.
Figure 5:
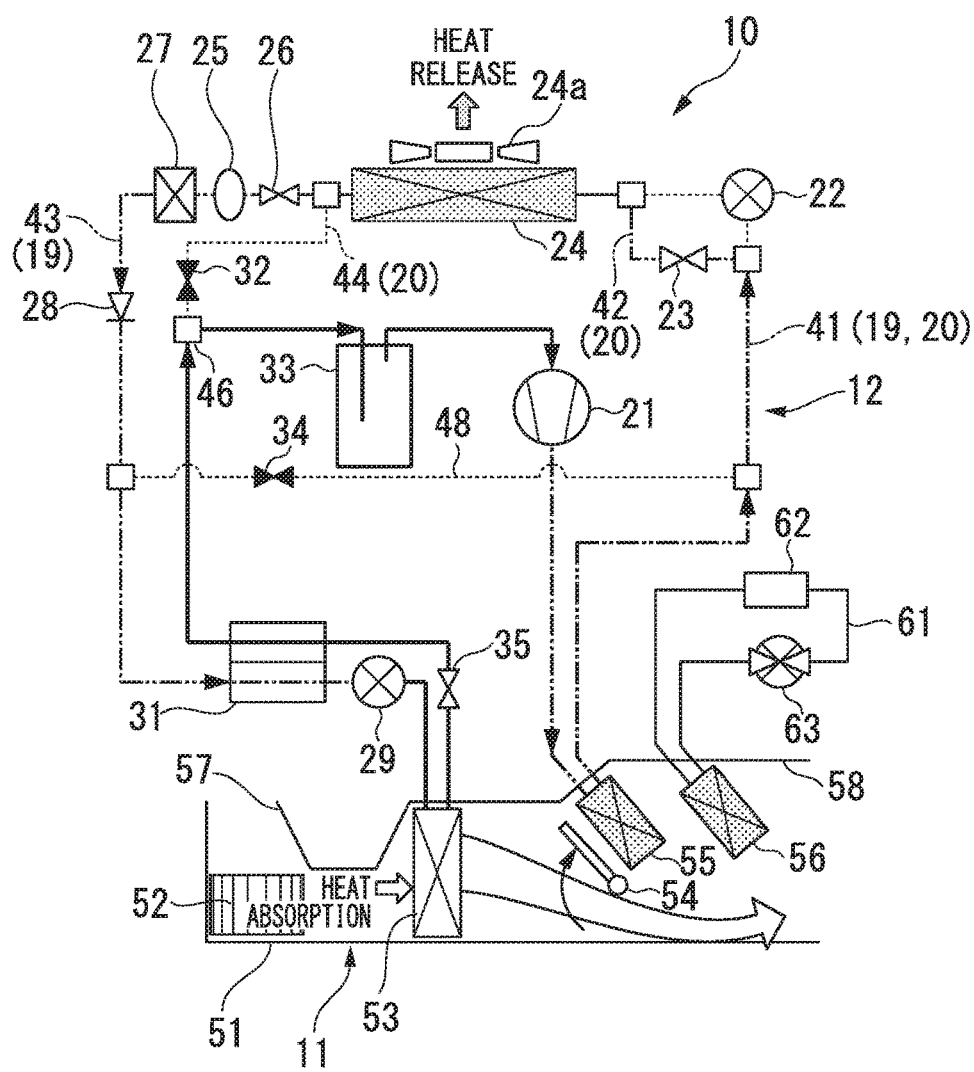
FIG. 5 is a configuration view of the vehicle air conditioner according to the embodiment of the present invention.

Next, a basic operation of the vehicle air conditioner 10 during the heating operation and during the cooling operation is described. FIG. 4 is a view for describing the operation of the vehicle air conditioner 10 during the heating operation. FIG. 5 is a view for describing the operation of the vehicle air conditioner 10 during the cooling operation. In FIG. 4 and FIG. 5, a chain line represents a high pressure state of the refrigerant, a solid line represents a low pressure state of the refrigerant, and a dashed line represents a part through which the refrigerant does not flow.

(Heating Operation)

During the heating operation, as shown in FIG. 4, the air mix door 54 is set to a heating position at which the heating path is opened, and the heating valve 32 is set to an open state. In the heating operation, the bypass valve 23, the cooling valve 26, the dehumidification valve 34, and the evaporation capability control valve 35 are set to a closed state.

In this case, the high-temperature and high-pressure refrigerant discharged from the compressor 21 heats the conditioning air in the duct 51 by heat release at the heating internal condenser 55.

The refrigerant that passes through the heating internal condenser 55 is expanded by the heating expansion valve 22 to be in a liquid-phase rich gas-liquid two-phase mist state, and then, absorbs heat from the external atmosphere at the external heat exchanger 24 to be in a gas-phase rich gas-liquid two-phase mist state. The refrigerant that passes through the external heat exchanger 24 passes through the heating bypass passage 44 and the junction part 46 and flows in the accumulator 33. The refrigerant that flows in the accumulator 33 is separated into gas and liquid in the accumulator 33, and the gas-phase refrigerant (liquid part of the refrigerant) is mainly suctioned into the compressor 21.

At this time, the conditioning air that flows in the duct 51 of the air conditioning unit 11 passes through the evaporator 53 and then passes the heating internal condenser 55 and the heater core 56 in the heating path.

Then, the conditioning air is heated when passing through the heating internal condenser 55 and the heater core 56 and then passes through the air blow port 58 to be supplied to the vehicle interior as heating air.

(Cooling Operation)

During the cooling operation, as shown in FIG. 5, the air mix door 54 is set to a cooling position at which the conditioning air that passes through the evaporator 53 passes through the cooling path, and the bypass valve 23, the cooling valve 26, and the evaporation capability control valve 35 are set to an open state. In the cooling operation, the heating expansion valve 22, the heating valve 32, and the dehumidification valve 34 are set to a closed state.

In this case, the high-temperature and high-pressure refrigerant discharged from the compressor 21 passes through the heating internal condenser 55 and the bypass valve 23, releases heat to the external atmosphere in the external heat exchanger 24, and then flows into the cooling main passage 43. Then, the excess part of the refrigerant is recovered by the receiver tank 25, and then, the heat of the refrigerant is released again to the external atmosphere at the sub condenser 27. Then, the refrigerant is expanded by the cooling expansion valve 29 to be in a liquid-phase rich gas-liquid two-phase mist state and then cools the conditioning air in the duct 51 by heat absorption at the evaporator 53.

Then, at the cooling supplementary heat exchanger 31, a heat exchange is performed on the gas-phase rich gas-liquid two-phase refrigerant that passes through the evaporator 53, and then, the refrigerant flows into the accumulator 33. The gas-phase rich refrigerant that flows in the accumulator 33 is separated into gas and liquid in the accumulator 33, and the gas-phase refrigerant (gas part of the refrigerant) is mainly suctioned to the compressor 21.

At this time, the conditioning air that flows in the duct 51 of the air conditioning unit 11 is cooled when passing through the evaporator 53 and then bypasses the heating internal condenser 55 to be supplied to the vehicle interior from the air blow port 58 as cooling air.

In the heating operation described above, when a state where the cooling valve 26 is closed and thereby the cooling main passage 43 is closed continues for a long time, there may be a possibility in that the refrigerant leaks from a gap of a valve part or the like, the refrigerant stays in the cooling main passage 43, and the refrigerant becomes insufficient in the refrigerant passage where the refrigerant is required. Therefore, when the cooling main passage 43 is continuously closed for a predetermined long time or more, the valve body such as the cooling valve 26 may be temporarily opened to avoid the refrigerant insufficiency in the refrigerant passage where the refrigerant is required. A case of a heating operation is described above; however, in a case where the refrigerant stays, similarly to the above-described case, in part of the refrigerant passage at the operation of another mode, when the operation mode is continued for a predetermined long time or more, similarly, the valve body can be preferably opened temporarily to avoid the refrigerant insufficiency at the refrigerant passage where the refrigerant is required.

Figure 6:
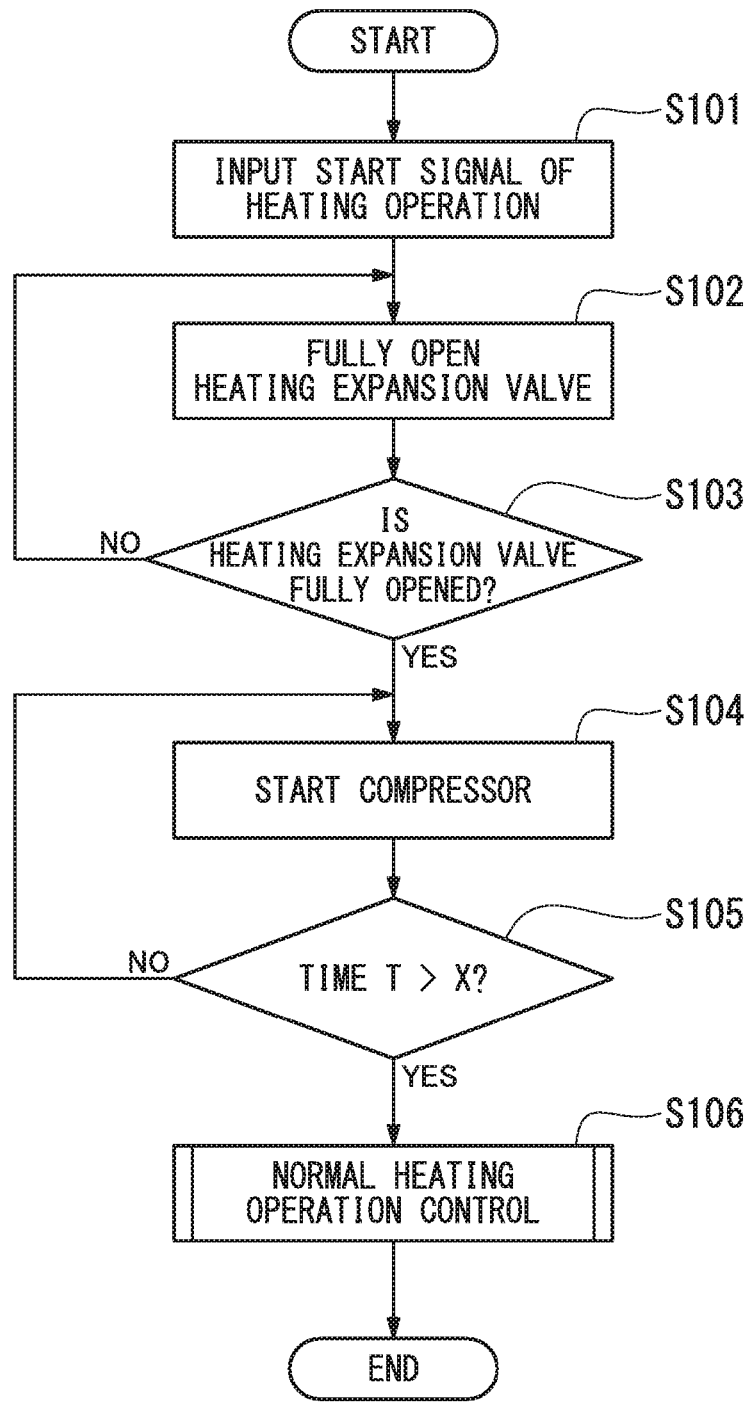
FIG. 6 is a flowchart for describing a control of the vehicle air conditioner according to the embodiment of the present invention.

Next, a control at the start of the heating operation of the vehicle air conditioner 10 according to the present embodiment is described with reference to the flowchart of FIG. 6.

When a start signal of a heating operation is input to the signal input unit 15 of the control device 13 in step S101, the valve opening degree control unit 17 increases the opening degree of the heating expansion valve 22, and the elapsed time determination unit 16 starts a measurement of an elapsed time in the following step S102. In step S103, it is determined whether or not the heating expansion valve 22 is fully opened, and the process returns to step S102 when the heating expansion valve 22 is not fully opened. In step S102 and step S103, the valve opening degree control unit 17 increases the opening degree of the heating expansion valve 22 until the heating expansion valve 22 is fully opened.

In this way, when the heating expansion valve 22 is fully opened, and the process proceeds to step S104, the compressor control unit 18 starts the compressor 21 at the timing. In the following step S105, the elapsed time determination unit 16 determines whether or not an elapsed time T from when the start signal is input to the signal input unit 15 exceeds a set time X, the process returns to step S104 when the elapsed time T does not exceed the set time X, and the process proceeds to step S106 at a timing at which the elapsed time T exceeds the set time X. The control in step S106 is an ordinary heating operation control. In step S106, the opening degree of the heating expansion valve 22 is caused to return to an opening degree during an ordinary heating operation by the valve opening degree control unit 17.

As described above, in the vehicle air conditioner 10 according to the present embodiment, part of the control device 13 relating to a heating operation has the signal input unit 15, the elapsed time determination unit 16, the valve opening degree control unit 17, and the compressor control unit 18, and the vehicle air conditioner 10 controls the heating expansion valve 22 such that at the start of the heating operation, the opening degree of the heating expansion valve 22 is maximized to start the compressor 21, and after the set time X elapses, the opening degree of the heating expansion valve 22 is caused to return to the ordinary opening degree during the heating operation.

Therefore, in the vehicle air conditioner 10 according to the present embodiment, it is possible to promptly increase the internal pressure of the compressor 21 and to stabilize the operation of the drive part such as the movable scroll 68 of the compressor 21 at the start of the heating operation. Accordingly, by employing the vehicle air conditioner 10 according to the present embodiment, it is possible to prevent vibrations or noises at the compressor 21 at the start of the heating operation from occurring.

The present invention is not limited to the above embodiment, and various design changes can be made without departing from the scope of the invention.

The invention claimed is:
1. A vehicle air conditioner comprising
   a heating refrigerant circuit having: a compressor that compresses and discharges a suctioned refrigerant; an internal condenser that releases heat of the refrigerant discharged from the compressor; an expansion valve that reduces a pressure of the refrigerant which passes through the internal condenser and that expands the refrigerant; and an external heat exchanger that exchanges heat between the refrigerant which passes through the expansion valve and external air and that causes the refrigerant after the heat exchange with the external air to return to the compressor, and
   a controller configured to receive a start signal of a heating operation, determine whether or not a set time elapses from when the start signal is input to the controller, control an opening degree of the expansion valve, and output a start command to the compressor,
   wherein the controller is configured to perform a noise and vibration suppression control such that at a start of a heating operation, the compressor is started after an opening degree of the expansion valve is increased to more than an ordinary opening degree during a heating operation, and after a set time elapses, the opening degree of the expansion valve is caused to return to the ordinary opening degree during a heating operation.

\* \* \* \* \*